United States Patent [19]
Hale

[11] Patent Number: 5,417,005
[45] Date of Patent: May 23, 1995

[54] MINNOW PICKUP DEVICE

[76] Inventor: Lacy Hale, 8951 Highway 78 W., Okeechobee, Fla. 34974

[21] Appl. No.: 67,475

[22] Filed: May 24, 1993

[51] Int. Cl.⁶ .................................... A01K 69/00
[52] U.S. Cl. ................................... 43/4; 24/545; 24/555; 24/560
[58] Field of Search ............... 43/4, 54.1; 24/530, 24/545, 555, 563, 560

[56] References Cited

U.S. PATENT DOCUMENTS

| 79,502 | 6/1868 | Roth | 24/530 |
| 451,925 | 5/1891 | Fritz | 24/545 |
| 1,399,661 | 12/1921 | Schroeder | 24/560 |
| 2,639,530 | 5/1953 | Merrill | 24/530 |
| 2,929,166 | 3/1960 | Sneide | 43/4 |
| 3,581,424 | 6/1971 | Bloom | 43/4 |

FOREIGN PATENT DOCUMENTS

0211589 3/1967 U.S.S.R. ........................ 24/563

Primary Examiner—P. Austin Bradley
Assistant Examiner—James Miner
Attorney, Agent, or Firm—Michael J. Colitz, Jr.; Dominik, Stein, Saccocio, Reese, Colitz & Van Der Wall

[57] ABSTRACT

A device adapted for holding an object comprising, in combination, an exterior component shaped in an inverted generally U-shaped cross-sectional configuration, the exterior component having a resilient upper portion and a lower portion formed of legs and terminating in parallel lines, the legs being movable, upon the application of pressure, to a holding orientation with the parallel lines spaced a distance to preclude the passage of a minnow therethrough, upon the release of the pressure, the legs move to a release orientation with the parallel lines spaced a distance to allow the passage of an object therethrough. A resilient interior component with an upper end adjacent to the upper portion and a lower end adjacent to a location above the parallel lines for thereby assisting in the return of the parallel lines to the release orientation after grasping an object in the space between the short legs and the lower end of the interior component.

6 Claims, 3 Drawing Sheets

MINNOW PICKUP DEVICE

BACKGROUND OF THE INVENTION

1. Field of the Invention

This invention relates to a minnow pickup device and, more particularly, to an apparatus for grasping a minnow and holding it while a hook is inserted therethrough, the apparatus comprising an exterior member in a generally inverted U-shaped configuration with a resilient central upper portion and with an interior component formed as a closed cell resilient foam within the exterior member except adjacent its lower free ends to thereby assist in holding the minnow and returning the lower free ends to an open orientation after hooking a minnow.

2. Description of the Background Art

Many types of devices are used today to assist fishermen. One such type of device includes apparatus for grasping live minnows while a hook is inserted through the minnow. Most fishermen simply hold a minnow in their fingers while hooking them. They do not bother to use devices. That is because there is no convenient and inexpensive device known today to effect the various intended results.

The intended results include the convenient grasping of the minnow sufficiently firmly to preclude its wigging or otherwise moving during the hooking operation. Such grasping should also be sufficiently gentle to preclude crushing. Further, the fingers of the fisherman should not contact the minnow, otherwise the scent of the user will be transferred to the fish rendering it less effective as bait. Such transfer of scent, in turn, reduces the probability of catching fish with the minnow as bait. If the fisherman's fingers accidentally touch the holding portion of the device, it may be necessary to wash it with a baking soda and water solution to remove any scent.

In addition, known devices are not sufficiently durable or convenient. Known devices are easily broken under normal usage at a fishing site and can sink if dropped, undesirable characteristics. Further, such devices require excessive manual dexterity which renders them useless for ice fishing where gloves are normally worn for warmth. Lastly, if minnow holding devices require less manual dexterity, they will be used more and the chances of catching fish will be thereby increased.

Various devices have been proposed in the prior art for use in grasping or holding minnows or other objects. By way of example, consider U.S. Pat. Nos. 2,883,783 to Del Matter; 2,929,166 to Sneide; 3,581,424 to Bloom; 3,862,407 to Martyn; 4,771,564 to Whitley; and 5,054,226, to Hart.

More specifically, the patent to Del Matter relates to a dipping and holding device having a foraminous receptacle with an open top. A pair of gripping elements are formed of resilient compressible material mounted in the receptacle. One of said elements is stationary and the other is laterally movable into and out of edgewise engagement with the stationary element.

The patent to Sneide relates to a pair of tongs for handling fishing worms, comprising handle portions sufficiently broad to be adapted to be closed on one side while the other side remains open and elongated jaws. The jaws are inwardly concave in their short dimension.

The patent to Bloom relates to a spring clamp which includes a pair of padded jaws at one end of a pair of levers, one of which is pivotable about a fulcrum link that is rigidly attached to the other lever, and the opposite end of the levers having a compression coil spring therebetween for normally urging the jaws into engagement with each other. A line guide is attached to one lever and projects into the space between the levers adjacent the spring.

The patent to Martyn relates to a fish bait holder which has a pair of substantially identical ring like devices adapted to be worn on the thumb and index finger of an individual's hand with each ring supporting a rectangular platform extending outwardly from the ring normal to the plane of the ring in a manner to rest on the surface of the fingertip. Having the ring thereon such that a worm or the like may be gripped between the platforms to hold the same. Further, each of the rings is adjustable as to the size of the ring opening to permit proper fitting on fingers having different diameters.

The patent to Whitley relates to apparatus for applying a fish attracting fluid to fishing tackle is disclosed. The apparatus includes a box having an upper portion with an opening including an upper segment of resilient, absorbent material attached therein.

Lastly, the patent Hart relates to a device for securing and holding live bait while it is applied to a fish hook. The bait holder is comprised of two sets of opposed slender fingers which mesh together without harm or injury to the bait. The fingers are curved to present concave surfaces towards the opposed set to center and position the bait for complete access to all portions of the bait for hook applying purposes.

No known fishing device including that of the prior art provides the benefits of the present inventions in such on efficient, convenient, economical manner.

Accordingly, it is an object of the invention to provide a device adapted for holding an object comprising, in combination, an exterior component shaped in an inverted generally U-shaped cross-sectional configuration, the exterior component having a resilient upper portion and a lower portion formed of legs and terminating in parallel lines, the legs being movable, upon the application of pressure, to a holding orientation with the parallel lines spaced a distance to preclude the passage of a minnow therethrough and, upon the release of the pressure, the legs move to a release orientation with the parallel lines spaced a distance to allow the passage of an object therethrough; and a resilient interior component with an upper end adjacent to the upper portion and a lower end adjacent to a location above the parallel lines for thereby assisting in the return of the parallel lines to the release orientation after grasping an object in the space between the short legs and the lower end of the interior component.

It is a further object of the invention is to maximize the convenience and durability of minnow holding devices.

It is a further object of the present invention to grasp minnows securely but gently while they are being hooked.

It is a further object of the present invention to increase the efficiency of fishing by not contacting the bait with human hands for the transfer of human scent to the bait.

These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiments in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into a device for grasping and holding a minnow whereby a hook may be inserted through the held minnow, the device comprising, in combination, an exterior component fabricated of polymeric material in sheet-like form and shaped in an inverted generally U-shaped cross-sectional configuration, the exterior component having (a) an upper portion symmetrically formed about its center line and resilient thereabout, (b) a central portion formed of outwardly flaired long legs extending downwardly from the upper portion for constituting the majority of the extent of the exterior component, and (c) a lower portion formed of inwardly flaired short legs extending downwardly from the long legs and terminating at parallel lines, the legs of the central and lower portions movable, upon the application of pressure to the long legs, to a holding orientation with the parallel lines spaced a distance to preclude the passage of a minnow therethrough and, upon the release of the pressure to the long legs, the legs of the central and lower portions resile to a release orientation with the parallel lines spaced a distance to allow the passage of a minnow therethrough; and an interior component fabricated of a closed cell resilient foam with a generally rectangular cross sectional configuration and generally parallel large faces, means to secure the parallel faces to the long legs with an upper end adjacent to the upper portion and a lower end adjacent to a location between the central and lower portions for thereby assisting in the return of the parallel lines to the release orientation after grasping and hooking a minnow in the space between the short legs and the lower end of the interior component.

The foregoing has outlined rather broadly, the more pertinent and important features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiments may be readily utilized as a basis for modifying or designing other methods and structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a more succinct understanding of the nature and objects of the invention, reference should be directed to the following description taken in conjunction with the accompanying drawings in which.

Similar reference numerals refer to similar parts throughout the several Figures.

DETAILED DESCRIPTION OF THE PREFERRED EMBODIMENT OF THE INVENTION

Figure 1:
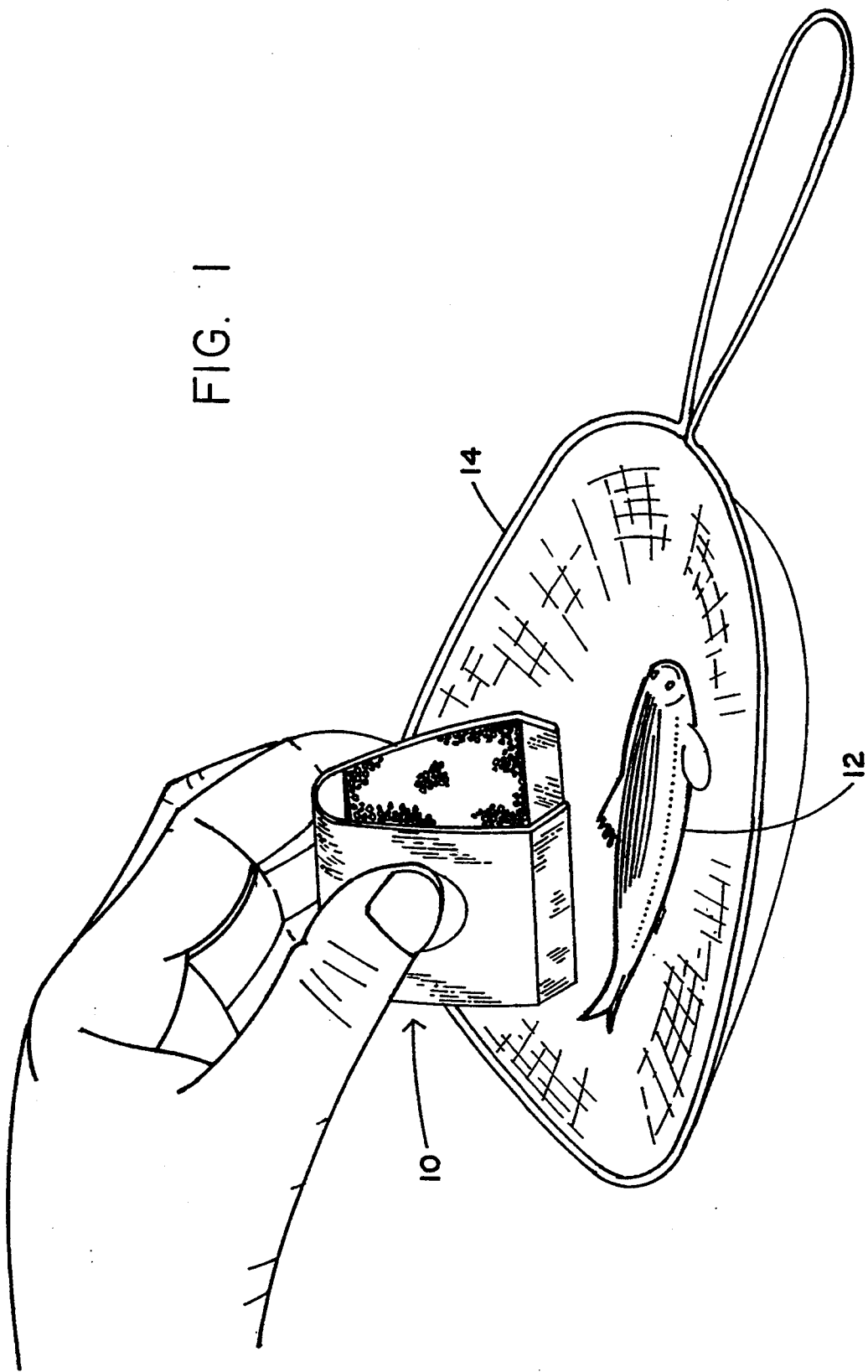
FIG. 1 is a perspective illustration of a minnow holding device constructed in accordance with the principles of the present invention.
Figure 2:
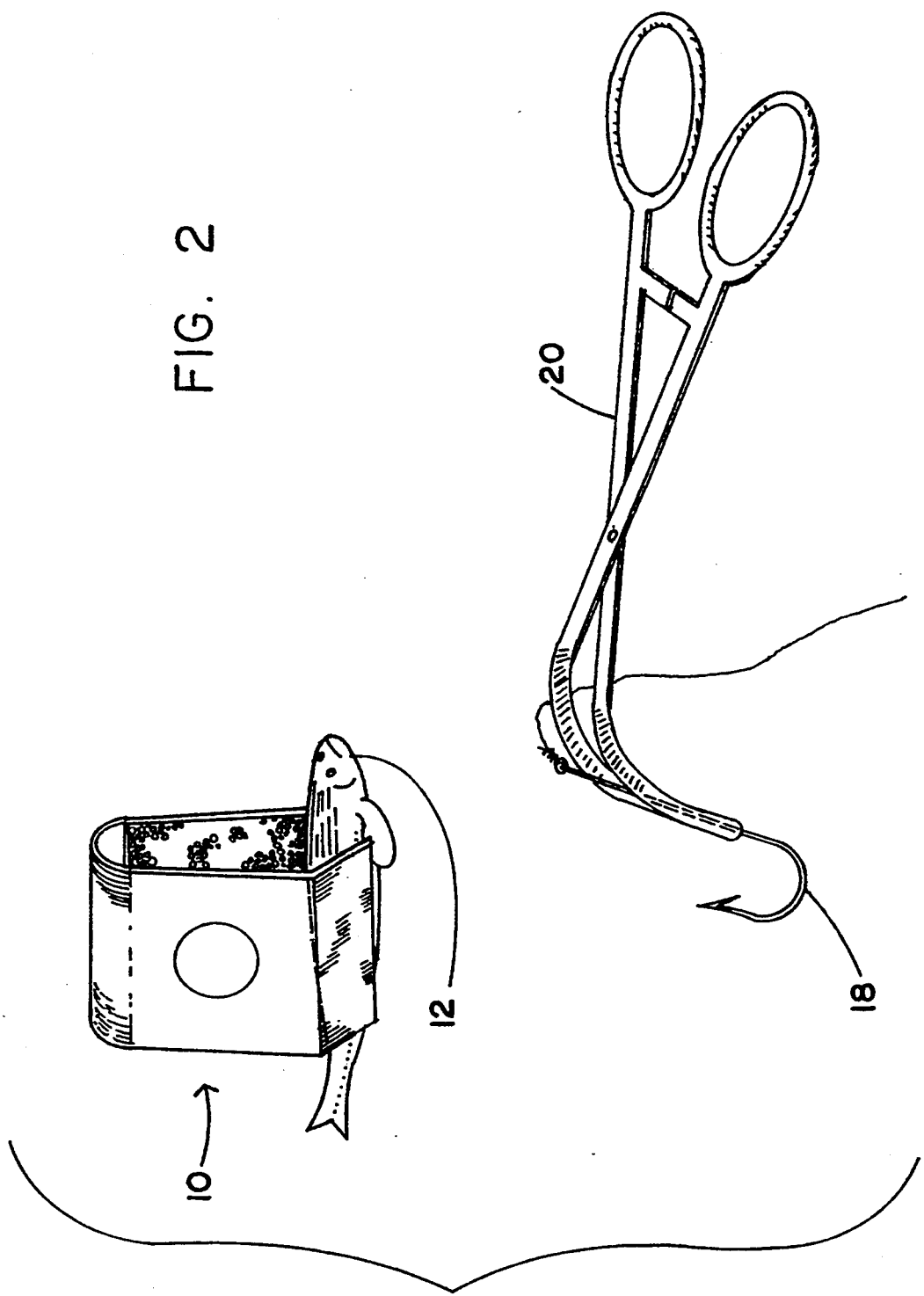
FIG. 2 is a perspective illustration similar to FIG. 1 with the device in the contracted orientation holding a minnow prior to hooking.
Figure 3:
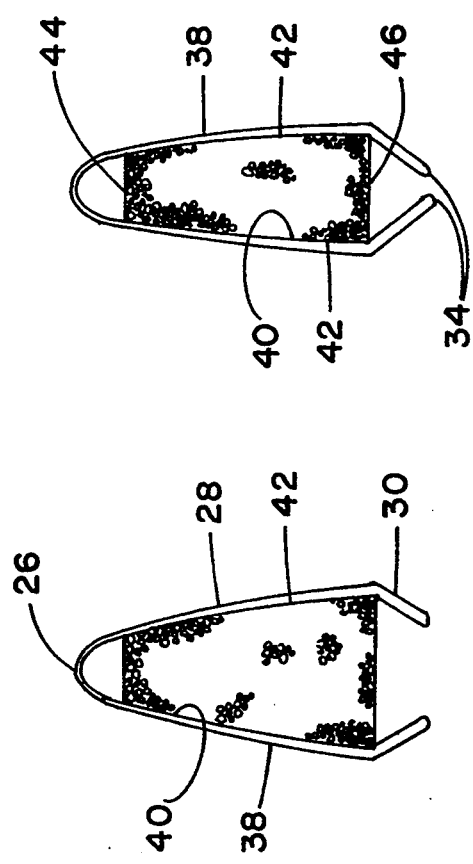
FIG. 3 and 4 are side elevational views of the device of FIGS. 1 and 2 in the expanded and contracted orientations.
Figure 4:
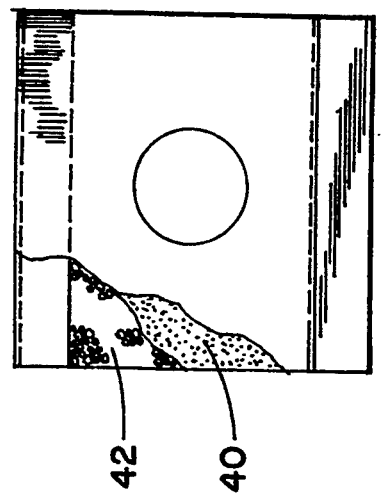

Shown in the Figures, with particular reference to FIGS. 1 and 2, there is illustrated a minnow holding device 10 for grasping and holding a live minnow. Greater detail may be seen in FIGS. 3 through 7. In FIG. 1, the device 10 is being held in one hand of the fisherman or other user. The device is in the release orientation. The other hand of the user is holding a shallow minnow dipper 14 supporting the minnow to be hooked. FIG. 2 shows the device in the holding orientation supporting the minnow. The other hand of the fisherman is holding a forceps 20 in which is held a fish hook 18 in anticipation of hooking the minnow. The positioning of the hook in the forceps may be at any angle being the choice of the fisherman.

The device 10 preferably comprises, a first or exterior component and a second or interior component. The exterior component 24 is preferably fabricated of polymeric material in sheet-like form and shaped in an inverted generally U-shaped cross-sectional configuration. The exterior component has an upper portion 26, symmetrically formed about its center line and resilient thereabout. A central portion 28 is formed as outwardly flaired long legs extending downwardly from the upper portion for constituting the majority of the extent of the exterior component. A lower portion 30 is formed of inwardly flaired short legs extending downwardly from the long legs and terminating at parallel lines 34. The legs of the central and lower portions are movable, upon the application of pressure to the long legs by a fisherman's fingers, to a holding orientation with the parallel lines spaced a distance to preclude the passage of a minnow therethrough. Note FIGS. 2 and 4. The short legs each flair inwardly about 30 degrees from the vertical when in the release orientation. Such angle assists in lifting the minnow upwardly into a gentle but secure relationship with the foam of the interior component 38 when the device 10 is moved into the holding orientation. Upon the release of the pressure to the long legs, the legs of the central and lower portions resile to a release orientation with the parallel lines spaced a distance to allow the passage of a minnow therethrough. Note FIGS. 1 and 3.

An interior component 38 is fabricated of a closed cell resilient foam with a generally rectangular cross sectional configuration. It has generally parallel large faces 42, and a layer of water proof glue 40 on each large face function to secure the parallel faces to the interior surfaces of the long legs. The interior component has an upper end 46 adjacent to the upper portion and a lower end adjacent to a location between the central and lower portions. The lower end 46 assists in the return of the parallel lines 34 to release orientation after the grasping of a minnow in the space between the short legs 30 and the lower end 46 of the interior component.

It is preferred that the exterior component 24 has its lower portions, their long legs and their short legs strengthened with respect to the upper U-shaped portion. In the primary embodiment of FIGS. 1 through 7, the strengthened lower portion is affected through a double layer of material.

Figure 8:
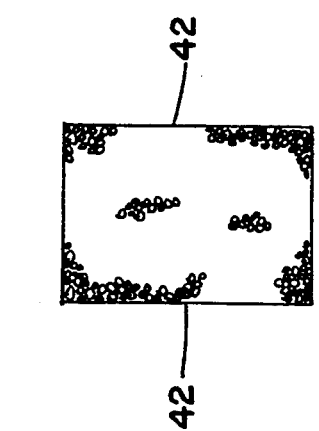
FIG. 8 is a side elevational view of a device constructed in accordance with an alternate embodiment of one invention, the device in the expanded orientation in anticipation of picking up a minnow.

The minnow pickup device of FIG. 8 is similar in function to that of FIGS. 1 through 7. Its interior component 50, however, has long faces 52 which taper to correspond with the tapers of the long faces 60 of the exterior component when in the release orientation of FIGS. 1, 3, 6 and 8. The long faces are folded back to form a double layer of material 62 in the lower extent of the exterior component for great strength. Further, the upper end 54 of the interior component extends upwardly to the top of the exterior component.

In both embodiments, the exterior component is preferably fabricated in a sheet-like material from a resilient polymer selected from the group of water resistant, resilient polymers including polyvinyl chloride (PVC) and polypropylene. The PVC is preferred. The sheet material is initially about 120 millimeters (4-½ inches) long, about 50 millimeters (2 inches) wide and about 2 millimeters (0.08 inch) thick in the unthickened regions. It is formed by heating, shaping and fast cooling. The long legs form an angle of about 30 degrees when in the release orientation.

The interior component is fabricated in a rectilinear form from a water resistant, closed cell, polymeric foam selected from the group of closed cell, polymeric foams including polyurethane, synthetic butyl rubber or any natural or synthetic sponge, like material. Polyethylene is preferred. The interior component is about 50 millimeters (2 inches) square and about 25 millimeters (1 inch) thick between the legs of the exterior component.

The selected materials render the device extremely durable while the foam of the interior member renders the device capable of floating if dropped in water. Further the closed cells preludes. water from entering the interior whereby undesirable lingering scents are precluded.

Figure 5:
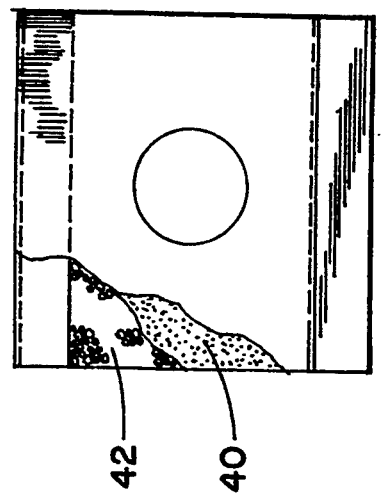
FIG. 5 is a front elevational view of the device of FIGS. 3 and 4 with parts broken up to show internal constructions.
Figure 6:
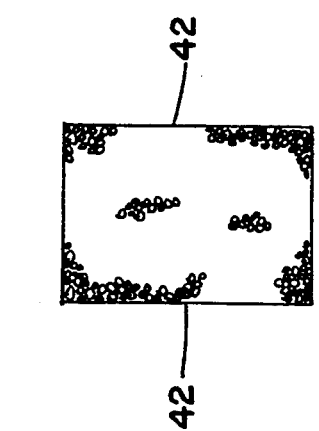
FIGS. 6 and 7 are side elevational views of the external and internal components of the device of the prior Figures.
Figure 7:
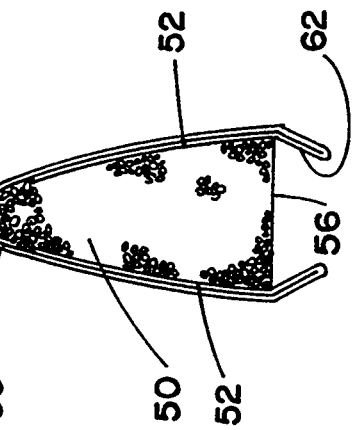

The exposed faces of the long legs constitute surfaces where a logo, advertisement, writing, indicia or other information may be placed. The circle seen in FIGS. 1, 2 and 5 is meant to illustrate such information. Such faces are the faces normally contacted by a fisherman's fingers during use. Grippability of such faces is preferably enhanced by roughening as through heating as by a soldering iron. The roughening may also be effected when the information is placed on the surface through imprinting, embossing or the like.

The references to fabrication techniques hereinabove are by example only. The device of the present invention is readily fabricated by simple hand techniques for limited quantities. The device could, however, be readily fabricated by more advanced manufacturing processes for high quantity runs.

The present disclosure includes that contained in the appended claims as well as that of the foregoing description. Although this invention has been described in its preferred form with a certain degree of particularity, it should be understood that the present disclosure of the preferred form has been made only by way of example and that numerous changes in the details of construction and combination and arrangement of parts may be resorted to without departing from the spirit and scope of the invention.

Now that the invention has been described,
What is claimed is:

1. A device for grasping and holding a minnow whereby a hook may be inserted through the held minnow, the device comprising, in combination:

an exterior component fabricated of polymeric material in sheet-like form and shaped in an inverted generally U-shaped cross-sectional configuration, the exterior component having (a) an upper portion symmetrically formed about its center line and resilient thereabout, (b) a central portion formed of outwardly flaired long legs extending downwardly from the upper portion for constituting the majority of the extent of the exterior component, and (c) a lower portion formed of inwardly flaired short legs extending downwardly from the long legs and terminating at parallel lines, the legs of the central and lower portions being movable, upon the application of pressure to the long legs, to a holding orientation with the parallel lines spaced a small distance to preclude the passage of a minnow therethrough and, upon the release of the pressure to the long legs, the legs of the central and lower portions resile to a release orientation with the parallel lines spaced a large distance to allow the passage of a minnow therethrough: and an interior component fabricated of a closed cell resilient foam with a generally rectangular cross sectional configuration and generally parallel large faces, means to secure the parallel faces to the long legs with an upper end adjacent to the upper portion and a lower end adjacent to a location between the central and lower portions for thereby assisting in supporting a minnow held by the short legs and for assisting in the return of the parallel lines to the release orientation after grasping and hooking a minnow in the space between the short legs and the lower end of the interior component.

2. A device adapted for holding an object comprising, in combination:

an exterior component shaped in an inverted generally U-shaped cross-sectional configuration, the exterior component having a resilient upper portion and a lower portion formed of legs and terminating in parallel lines, the legs being movable, upon the application of pressure, to a holding orientation with the parallel lines spaced a small distance to preclude the passage of a minnow therethrough and, upon the release of the pressure, the legs move to a release orientation with the parallel lines spaced a large distance to allow the passage of an object therethrough; and a resilient interior component with an upper end adjacent to the upper portion and a lower end adjacent to a location above the parallel lines for thereby assisting in the support of an object held by the legs and for assisting in the return of the parallel lines to the release orientation after grasping an object in the space between the short legs and the lower end of the interior component wherein the lower portion is strengthened with respect to the upper portion.

3. A device adapted for holding an object comprising, in combination:

an exterior component shaped in an inverted generally U-shaped cross-sectional configuration, the exterior component having a resilient upper portion and a lower portion formed of legs and terminating in parallel lines, the legs being movable, upon the application of pressure, to a holding orientation with the parallel lines spaced a small distance to preclude the passage of a minnow therethrough and, upon the release of the pressure, the legs move to a release orientation with the parallel lines spaced a large distance to allow the passage of an object therethrough; and a resilient interior component with an upper end adjacent to the upper portion and a lower end adjacent to a location above the parallel lines for thereby assisting in the support of an object held by the legs and for assisting in the return of the parallel lines to the release orientation after grasping an object in the space between the short legs and the lower end of the interior component wherein the lower portion is strengthened with respect to the upper portion, and wherein the strengthened lower portion is effected through material thicker than the upper portion.

4. A device adapted for holding an object comprising, in combination:

an exterior component shaped in an inverted generally U-shaped cross-sectional configuration, the exterior component having a resilient upper portion and a lower portion formed of legs and terminating in parallel lines., the legs being movable, upon the application of pressure, to a holding orientation with the parallel lines spaced a small distance to preclude the passage of a minnow therethrough and, Upon the release of the pressure, the legs move to a release orientation with the parallel lines spaced a large distance to allow the passage of an object therethrough; and a resilient interior component with an upper end adjacent to the upper portion and a lower end adjacent to a location above the parallel lines for thereby assisting in the support of an object held by the legs and for assisting in the return of the parallel lines to the release orientation after grasping an object in the space between the short legs and the lower end of the interior component wherein the lower portion is strengthened with respect to the upper portion, and wherein strengthened lower portion is effected through a double layer of material.

5. A device adapted for holding an object comprising, in combination:

an exterior component shaped in an inverted generally U-shaped cross-sectional configuration, the exterior component having a resilient upper portion and a lower portion formed of legs and terminating in parallel lines, the legs being movable, upon the application of pressure, to a holding orientation with the parallel lines spaced a small distance to preclude the passage of a minnow therethrough and, Upon the release of the pressure, the legs move to a release orientation with the parallel lines spaced a large distance to allow the passage of an object therethrough; and a resilient interior component with an upper end adjacent to the upper portion and a lower end adjacent to a location above the parallel lines for thereby assisting in the support of an object held by the legs and for assisting in the return of the parallel lines to the release orientation after grasping an object in the space between the short legs and the lower end of the interior component wherein the exterior component is fabricated in a water-resistant sheet material from polyvinyl chloride.

6. A device adapted for holding an object comprising, in combination:

an exterior component shaped in an inverted generally U-shaped cross-sectional configuration, the exterior component having a resilient upper portion and a lower portion formed of legs and terminating in parallel lines, the legs being movable, upon the application of pressure, to a holding orientation with the parallel lines spaced a small distance to preclude the passage of a minnow therethrough and, upon the release of the pressure, the legs move to a release orientation with the parallel lines spaced a large distance to allow the passage of an object therethrough; and a resilient interior component with an upper end adjacent to the upper portion and a lower end adjacent to a location above the parallel lines for thereby assisting in the support of an object held by the legs and for assisting in the return of the parallel lines to the release orientation after grasping an object in the space between the short legs and the lower end of the interior component wherein the interior component is fabricated in a rectilinear form from a water-resistant, closed cell, polymeric foam.

* * * * *